2,727,898

QUATERNARY AMMONIUM DERIVATIVES OF BENZODIONOLES

Gordon A. Grant, Montreal, Quebec, William Lawrence Glen, Baie d'Urfe, Quebec, and Richard J. Barber, Ville St. Laurent, Quebec, Canada, assignors, by mesne assignments, to American Home Products Corporation, New York, N. Y., a corporation of Delaware No Drawing. Application April 27, 1953,
Serial No. 351,518

4 Claims. (Cl. 260—296)

This invention relates to new quarternary ammonium compounds which are active pharmacologically, and which possess valuable therapeutic and other uses.

More particularly, this invention relates to chemical compounds having the following generic formula:

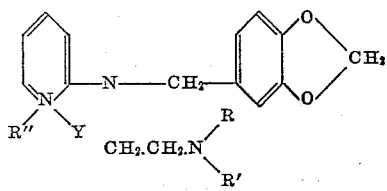

where R, R' and R'' are lower alkyl radicals, such as methyl, ethyl, isopropyl, n-propyl, butyl, isobutyl, etc. and may be the same or different radicals; and Y is an anion, such as —$SO_4CH_3$, or a halogen such as chlorine, bromine or iodine.

These new chemical compounds are prepared by reacting a benzodionole base having the generic formula:

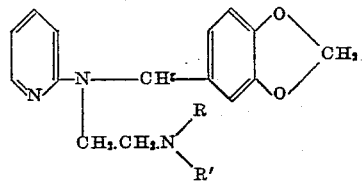

where R and R' have the significance above stated, with a quaternizing agent, such as dimethyl sulfate, methyl chloride, methyl bromide, methyl iodide, ethyl chloride, ethyl bromide, ethyl iodide, etc. It is the nitrogen atom in the pyridine ring which is rendered quarternary.

The starting material, i. e. the benzodionole base, is readily prepared by the method described in the patent application of Glen and Grant, Ser. No. 31,386, filed June 5, 1948 (now abandoned). In accordance with that method α-(3,4 - methylenedioxybenzylamino) - pyridine is first prepared by a known method, as for example by the method of Tschitschibabin and Knunjanz, Ber. 64, (1931), page 2839. This is then reacted with a dialkylamino alkyl halide of the formula:

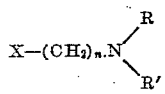

where X is a halogen such as chlorine or bromine, and where R and R' are as defined above, and n is an integer from 2 to 5. The reaction is preferably carried out in an inert solvent with an alkali metal amide, such as sodamide, as an acid binding agent.

For example, in preparing a compound of the formula:

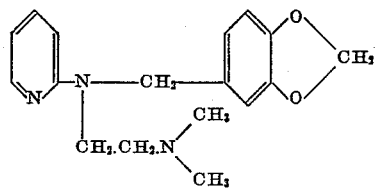

to use as starting material in preparing the new compounds, α - (3,4 - methylenedioxybenzylamino) - pyridine may be reacted with dimethylaminoethyl chloride, using sodamide as the acid binding agent. The reaction is preferably carried out using an excess of the dimethylaminoethyl chloride, and in the presence of an inert solvent such as benzene.

In accordance with our invention, the particular benzodionole base selected is reacted with the quaternizing agents previously specified. For example, if the starting material has the formula:

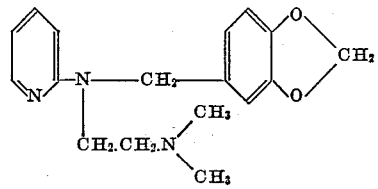

the resulting compounds may be presented by the following generic formula:

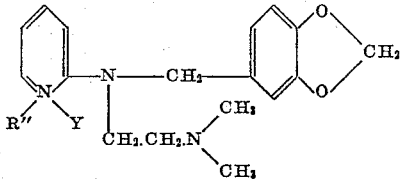

where R'' and Y have the significance explained above.

As illustrative of our invention, the following examples may be given:

Example 1

A mixture of 30 grams of benzodionole base of the formula:

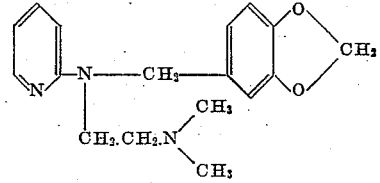

100 milliliters of nitrobenzene, and 30.8 grams of methyl iodide was warmed under reflux on the water bath for three hours. It was then allowed to cool and stand overnight at room temperature. The yellow crystalline solid which separated was collected and washed with ether.

The filtrate and ether wash liquids were combined, and then diluted by the addition of further quantities of ether. A gummy solid was deposited which was collected, washed with ether and dried. This dry material was then dissolved in 800 milliliters of water, and the solution filtered and extracted three times with ether, each time using 200 milliliters of ether, in order to remove residual nitrobenzene. The resulting aqueous solution was treated with decolorizing charcoal, filtered, and the solution evaporated to dryness under reduced pressure less than atmospheric. The solid material resulting was dissolved in methanol, and the methanolic solution diluted by the addition of ether until incipient turbidity was observed. It was then allowed to stand at room temperature, whereupon a crystalline product was deposited. This was collected and recrystallized from water, giving practically colorless crystals having a melting point of 160° C.

The crystalline material so obtained was combined with the identical product, melting at 160° C., obtained directly after the reaction mixture had been allowed to stand overnight at room temperature. Analysis of the combined crystalline product confirmed the empiric formula $C_{18}H_{24}O_2N_3I$, for a benzodionole monomethiodide.

Example 2

A mixture of 29.9 grams of benzodionole base of the formula given in Example 1, 50 milliliters of dry acetone, and 10 milliliters of methylsulfate, was introduced into a round bottom flask of 250 milliliters' capacity. The mixture was heated under reflux for a period of one-half hour, moisture being excluded, and it was then cooled. A crystalline product formed in the reaction mixture and was collected. This product was then recrystallized twice from a hot solvent comprising acetone containing 4 percent of methanol. A typical sample of the product obtained by recrystallization had a melting point of 148–9° C. Analysis confirmed the empiric formula $C_{19}H_{27}O_6N_3S$, for a benzodionole methosulfate.

Example 3

A mixture of 120 grams of benzodionole base of the formula given in Example 1 and 400 milliliters of dry acetone was introduced into a 2-neck round bottom flask of one liter capacity. There was then allowed to drop into this mixture 56 milliliters of methyl iodide. The mixture was stirred, with the exclusion of moisture.

The reaction mixture was then heated at 65–70° C. for six hours and stirred during the heating. Upon cooling a crystalline product separated and was collected. This crystalline product was recrystallized from a mixture of methanol and ether. A typical sample of the recovered product melted at 159–160° C., and analysis confirmed the empiric formula $C_{18}H_{24}O_2N_3I$ for a benzodionole monomethiodide.

Example 4

10 grams of benzodionole methiodide as prepared in Example 3 was introduced into a round bottom flask of one liter capacity, and there was added 14 grams of silver chloride and 200 milliliters of aqueous 20 percent methanol solution. The mixture was refluxed for six hours on a water bath, and the resulting precipitate filtered off and washed with 100 milliliters of hot aqueous 20 percent methanol. The wash water was added to the filtrate and the liquid concentrated to a syrup. A crystalline product separated, and it was recrystallized from acetone containing 4 percent of methanol. A typical sample of the resulting crystalline product melted at 119–121° C. Analysis confirmed the empiric formula $C_{18}H_{24}O_2N_3Cl$ for a benzodionole monomethochloride.

Example 5

A mixture of 29.9 grams of benzodionole base of the formula given in Example 1 and 150 milliliters of dry acetone was introduced into a round bottom flask of 500 milliliters' capacity. Methyl bromide gas was passed in for three hours, moisture being excluded. The reaction mixture was then cooled and the crystalline product that was formed was collected. Upon recrystallization from a mixture of methyl alcohol and ether, a crystalline benzodionole monomethobromide of the empiric formula $C_{18}H_{24}O_2N_3Br$ was secured.

The new compounds have valuable pharmacological properties, being especially useful as antispasmodic and anti-ulcer agents. They inhibit gastric secretion as shown by the following illustrative test, as carried out following the standard test procedure using the Shay rat as the test animal. The amount of benzodionole methiodide used in the test was 200 milligrams per kilogram weight of the test animal.

| | Milliliters of Gastric Juice | Milliliters of 0.01 N HCl in gastric contents | |
|---|---|---|---|
| | | Free | Total |
| Control animal (No antisecretory agent administered) | 7.1 | 13.3 | 62 |
| Animal to whom benzodionole methiodide was administered | 1.05 | 0.3 | 14 |

Similar test results were secured with benzodionole methosulfate, benzodionole monomethochloride, and benzodionole monomethobromide.

Since various changes and modifications may be made in our invention as disclosed herein without departing from the scope thereof, it is our intention that such changes and modifications as may be within the scope of the appended claims will be regarded as part of our invention.

We claim:

1. A quaternary ammonium compound having the generic formula:

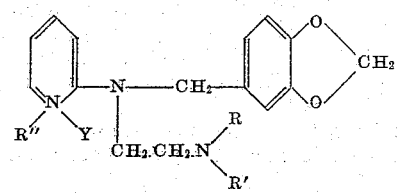

where R, R' and R'' represent lower alkyl radicals, and Y is an anion selected from the group which consists of —$CH_3SO_4$, chloride, bromide and iodide.

2. A compound having the formula:

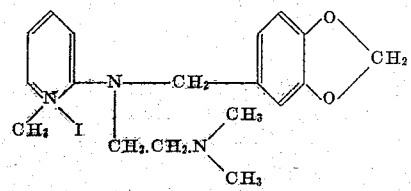

3. The process of preparing quaternary ammonium compounds which comprises heating a compound having the following formula:

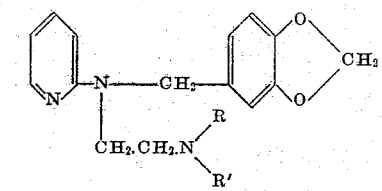

where R and R' are lower alkyl radicals with a quaternizing agent selected from the group which consists of lower alkyl sulfates, lower alkyl chlorides, lower alkyl bromides, and lower alkyl iodides, and recovering said quaternary ammonium compounds from the reaction mixture.

4. The process of preparing quaternary ammonium compounds which comprises heating a compound having the following formula:

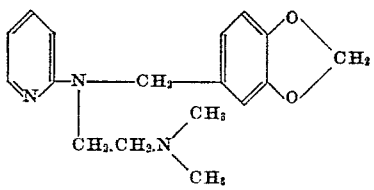

with a quaternizing agent selected from the group which consists of lower alkyl sulfates, lower alkyl chlorides, lower alkyl bromides and lower alkyl iodides, and recovering said quaternary ammonium compounds from the reaction mixture.

References Cited in the file of this patent

Viaud: Produits Pharmac. France, vol. 2, No. 2, pp. 53–64 (1947).

Idson: Chem. Reviews, vol. 47, pp. 462–3 (1950).